US010059795B2

(12) United States Patent
Mielke et al.

(10) Patent No.: US 10,059,795 B2
(45) Date of Patent: Aug. 28, 2018

(54) REACTIVE HYDROXYLATED AND CARBOXYLATED POLYMERS FOR USE AS ADHESION PROMOTERS

(71) Applicant: Sun Chemical Corporation, Parsippany, NJ (US)

(72) Inventors: Mark Andreas Mielke, Bedminster, NJ (US); Mathew Charles Mathew, Boomfield, NJ (US); William P. Keavaney, Pompton Plains, NJ (US); Richard John Czarnecki, Wayne, NJ (US); William Ford Wilson, Seabrook, NH (US); Mark John Lindsey, Morris Plains, NJ (US); Ralph Francis Arcurio, Bridgewater, NJ (US)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 110 days.

(21) Appl. No.: 15/010,084

(22) Filed: Jan. 29, 2016

(65) Prior Publication Data

US 2017/0218112 A1    Aug. 3, 2017

Related U.S. Application Data

(62) Division of application No. 14/690,777, filed on Apr. 20, 2015, now Pat. No. 9,279,034, which is a division of application No. 10/579,817, filed as application No. PCT/US2004/038438 on Nov. 16, 2004, now Pat. No. 9,034,958.

(60) Provisional application No. 60/520,966, filed on Nov. 17, 2003.

(51) Int. Cl.
| | |
|---|---|
| C08G 18/00 | (2006.01) |
| C08G 18/83 | (2006.01) |
| C09D 11/03 | (2014.01) |
| C09D 11/102 | (2014.01) |
| C08G 18/08 | (2006.01) |
| C09D 175/04 | (2006.01) |
| C09D 177/00 | (2006.01) |
| C09D 7/65 | (2018.01) |

(52) U.S. Cl.
CPC ....... *C08G 18/838* (2013.01); *C08G 18/0823* (2013.01); *C09D 7/65* (2018.01); *C09D 11/03* (2013.01); *C09D 11/102* (2013.01); *C09D 175/04* (2013.01); *C09D 177/00* (2013.01)

(58) Field of Classification Search
None
See application file for complete search history.

(56) References Cited

U.S. PATENT DOCUMENTS

| | | |
|---|---|---|
| 3,049,515 A | 8/1962 | Damusis |
| 3,412,054 A | 11/1968 | Milligan |
| 3,419,510 A | 12/1968 | Hudak |
| 3,640,924 A | 2/1972 | Hermann |
| 4,018,849 A | 4/1977 | Chang et al. |
| 4,156,066 A | 5/1979 | Gould |
| 4,255,550 A | 3/1981 | Gould |
| 4,659,848 A | 4/1987 | Kay et al. |
| 4,705,568 A | 11/1987 | Kay et al. |
| 4,762,902 A | 8/1988 | Murphy |
| 4,882,379 A | 11/1989 | Pankratz |
| 4,904,706 A | 2/1990 | Ueniser et al. |
| 5,177,141 A | 1/1993 | Thoma et al. |
| 5,328,940 A | 7/1994 | Zimmer |
| 5,908,700 A | 6/1999 | Shimizu et al. |
| 5,977,215 A | 11/1999 | Tien et al. |
| 5,981,625 A | 11/1999 | Zou et al. |
| 5,985,987 A | 11/1999 | Adolfsson et al. |
| 6,610,412 B2 | 8/2003 | Ungefug |
| 7,619,021 B2 | 11/2009 | Duncan |

FOREIGN PATENT DOCUMENTS

| | | |
|---|---|---|
| EP | 0 147 642 | 7/1985 |
| GB | 1 236 088 | 6/1971 |
| GB | 2 161 811 | 1/1986 |
| JP | 10-67959 | 3/1998 |
| WO | WO 2004/053003 | 6/2004 |

OTHER PUBLICATIONS

Alkyl/Aryl Acid Phosphate Technical Information Safety & Handling Bulletin, IsleChem, LLC, AAPS&H 07/08, pp. 1-15.
International Search Report for PCT/US2004/038438 dated Apr. 6, 2005.
Patent Abstracts of Japan, vol. 1998, No. 8 (1998).
Written Opinion of the International Searching Authority for PCT/US2004/038438 dated Apr. 6, 2005.
International Preliminary Report on Patentability Issued for PCT/US2004/038438 dated May 22. 2006.

*Primary Examiner* — Ana L Woodward
(74) *Attorney, Agent, or Firm* — Charles C. Achkar; Ostrolenk Faber LLP

(57) ABSTRACT

A polymer complex is disclosed which is the reaction product of one or more polymers having a terminal or pendant hydroxyl group, or a terminal or pendent carboxyl group, or combinations thereof, with at least one metal complex and one alkyl phosphate. This polymer complex acts as an adhesion promotion agent as well as a viscosity stabilizer when formulated in a printing ink or coating.

37 Claims, No Drawings

REACTIVE HYDROXYLATED AND CARBOXYLATED POLYMERS FOR USE AS ADHESION PROMOTERS

CROSS REFERENCE TO RELATED APPLICATIONS

This application is a divisional application of U.S. application Ser. No. 14/690,777, filed Apr. 20, 2015, which is a divisional of U.S. application Ser. No. 10/579,817, filed Oct. 23, 2007 as a national stage filing of corresponding international application number PCT/US2004/038438, filed on Nov. 16, 2004, which claimed priority to and benefit of U.S. Application No. 60/520,966, filed on Nov. 17, 2003, each of which is hereby incorporated herein by reference in its entirety.

FIELD OF THE INVENTION

The invention relates to ink compositions containing hydroxylated and carboxylated polymers that are functionalized with reactive metal complexes and alkyl phosphates, which provide adhesion to a wide range of substrates without decreasing the viscosity stability of the composition.

BACKGROUND OF THE INVENTION

A number of hydroxylated and carboxylated polymers have been found to be useful in imparting adhesion to a variety of substrates, including paper, plastics, metal, and glass. These include polyurethanes, polyurethane-ureas, polyamides, polyesters, polyacrylates, ketone-formaldehyde copolymers, and nitrocellulose that have been used for many years in surface coating formulations. Such materials impart a number of properties to surface coatings, including adhesion, gloss, pigment wetting, surface hardness, and grease resistance.

Typically, substances added to printing inks to promote improved adhesion to substrates (adhesion promoters) cause the ink to undergo an increase in viscosity or completely gel on storage. Since inks need to be of a proper viscosity to perform given their specific application on press, viscosity increases cause a detrimental effect on the printing process. At the very least, inks that increase in viscosity must be adjusted to lower their viscosity, or in some cases, become unusable altogether. Viscosity stability in inks, with or without the use of adhesion promoters, is something that is required for proper performance.

In 1955, an article in *Chemical and Engineering News* reported the use of titanium chelates, a byproduct of pigment manufacture, for formulating heat resistant coatings. These compounds also found utility as additives in nitrocellulose-based printing inks. The most common titanium chelate, titaniumdiacetylacetonate (TiAA), is a reaction product of tetraisopropyltitanate and acetylacetone (AA or 2,4-pentanedione). This additive and variants thereof are used in formulations throughout the printing ink, paint, and coatings industry. The main disadvantages of its use is:

A yellowing of the surface it coats. TiAA is a stable complex and contains, in addition to the two AA groups, two isopropyl groups, which can split off under heat and be exchanged by OH groups in a formulation (OH groups of the nitrocellulose e.g.). The TiAA body is susceptible to reacting with aromatic rings, mainly phenolics present in wood rosin and polyamides forming a deep brownish complex and therefore causes yellowing, especially in white pigmented coating formulations.

Odor. In addition to yellowing, the AA groups can evolve as the surface coating dries. These AA groups have a bitter odor that can be sensed at low concentrations. Therefore formulators of coatings and inks prefer to completely avoid AA group containing additives in applications such as food packaging.

In order to solve the problems described above, in 1985 non-yellowing and low odor adhesion promoters were developed, a description of these can be found in U.S. Pat. Nos. 4,659,848 and 4,705,568, and also DE 3525910A1. Materials based on these promoters have the disadvantage of having too low a reactivity to, for example, give immediate adhesion of an ink to a substrate after a short trigger time in a drying oven on press. In the case of printing inks, this requires the printer to either reduce the web speed through the printing press to achieve higher temperatures (reducing productivity) or increasing the effective temperature inside the drying oven (increasing cost). In addition, these highly reactive compounds often interact prematurely with other components (resins, pigments, additives) in surface coating or ink formulations, resulting in depletion of their adhesion promoting effect and, even more damaging, an unacceptable increase in the viscosity of the coating or ink formulation prior to application.

Based upon these facts, there is clearly a need in the art for additives that promote better viscosity stability, or better adhesion onto substrates, or in the best case, do both with a single additive.

SUMMARY OF THE INVENTION

The present invention is new class of reactive polymers or polymer complexes that is the reaction product of at least one polymer containing terminal and/or pendant hydroxyl and/or terminal and/or pendant carboxyl groups, or combinations thereof, with at least one metal complex and at least one alkyl phosphate.

The present invention provides a viscosity stabilizing and/or an adhesion promoting polymer complex which comprises the reaction product of one or more polymers having a terminal and/or pendant hydroxyl group, or a terminal and/or pendent carboxyl group, and combinations thereof, with at least one metal complex and at least one alkyl phosphate.

The present invention also provides an ink or coating composition comprising the reaction product of one or more polymers having a terminal and/or pendant hydroxyl group, or a terminal and/or pendent carboxyl group, or combinations thereof, with at least one metal complex and at least one alkyl phosphate.

The present invention also provides a method of stabilizing the viscosity of printing ink, paint or coating composition by adding to said composition a viscosity stabilizing agent which is the reaction product of one or more polymers having a terminal and/or pendant hydroxyl group, or a terminal and/or pendent carboxyl group, or combinations thereof, with at least one metal complex and at least one alkyl phosphate.

The present invention further provides a method of improving the adhesion performance of an ink or coating composition by adding to said composition an adhesion promoting polymer complex which is the reaction product of at least one metal complex with one or more polymers having a terminal and/or pendant hydroxyl group, or a terminal and/or pendent carboxyl group, or combinations thereof, and at least one metal complex and at least one alkyl phosphate. With the present invention a lamination bond strength is achieved at a lower level of metal complex.

The present invention also provides a method of improving the lamination bond strength of an ink or coating composition comprising adding to said composition an agent which is the reaction product of one or more polymers having a terminal and/or pendant hydroxyl group, or a terminal and/or pendent carboxyl group, or combinations thereof, with at least one metal complex and at least one alkyl phosphate.

Other objects and advantages of the present invention will become apparent from the following description and appended claims.

DETAILED DESCRIPTION OF THE INVENTION

It has now been surprisingly found that the adhesion promoting performance of hydroxylated and carboxylated polymers in a printing ink or coating can be enhanced by incorporating additional reactive functional sites on the polymeric backbone of the polymer thereby developing a new class of reactive polymers.

This new class of reactive polymers is the reaction product of at least one polymer containing terminal and/or pendant hydroxyl and/or terminal and/or pendant carboxyl groups, or combinations thereof, and at least one metal complex and at least one alkyl phosphate. The new polymer demonstrates unexpected levels of adhesion at lower levels of metal complex when compared to polymeric systems where the hydroxylated or carboxylated polymer and organometallic or metal containing compounds are added individually to, for example, a surface coating formulation. Specifically, two distinct beneficial effects have been recognized when these new reactive polymers are used in an ink or coating formulation.

As compared to the individual use of metal complexes alone, the viscosity stability in inks and coatings (especially pigmented systems) is enhanced As compared to the use of the hydroxylated or carboxylated polymers alone, the adhesion performance is enhanced and more rapidly achieved in surface coatings, especially under lower temperature drying conditions. In lamination applications improved performance is demonstrated by superior lamination bond strength.

Metal Complex

Preferably, the metal complex is metal orthoester which also preferably has the general formula (metal)(OR)$_4$ in which R represents an alkyl group which usually contains up to 8 carbon atoms. However, more preferably the alkyl group has 3 or 4 carbon atoms. It is of course possible that mixed alkyl orthometallics may be used such as mixed isopropyl butyl compounds. Most preferably, the metal containing compound is tetraisopropyltitanate.

Polymer Backbone

Generally speaking, the hydroxylated or carboxylated polymer used to prepare the reactive hydroxylated polymer can be any polymer having terminal and/or pendant hydroxyl or carboxyl groups. These can be either natural or synthetic resins, including (but not limited to) polyurethanes, polyurethane-ureas, polyamides, polyesters, polyacrylates, ketone-formaldehyde copolymers, nitrocellulose. These can be polymers suitable for both solvent based and water based coatings.

Alkyl Phosphate

The alkyl phosphate is used in the reaction to stabilize the polymer complex. Preferably, monoalky or dialkyl phosphates are used. The monoalkyl phosphate used will have the general formula (R$_1$O)PO(OH)$_2$ and the dialkyl phosphate will have the general formula (R$_2$O)(R$_3$O)PO(OH), wherein R$_1$, R$_2$ and R$_3$ each independently represents an alkyl group which can contain up to 10 carbon atoms but preferably contains no more than 5 carbon atoms. Also, preferably R$_1$, R$_2$ and R$_3$ are identical when mixed monoalkyl and dialkyl phosphates are to be used but this need, not necessarily be so. Naturally, if desired, the dialkyl phosphate can include different alkyl groups. Most preferably, the alkyl phosphate used is amyl acid phosphate.

Example 1 Preparation of Reactive Polymers

A. Adhesion-Modified Hydroxyl Functional Polyol Resin

In a clean, dry reactor under nitrogen, n-propyl acetate (20.93 grams) was charged along with Degussa Synthetic Resin SK (20.94 grams). The resulting reaction slurry was stirred and heated to 50-60° C. until all of the resin was dissolved. The reactor temperature was then cooled to 25-35° C. Tetraisopropyltitanate (33.91 grams) was added over 15 minutes and the mixture stirred for 15 minutes. The formation of the intermediate reaction product was followed by monitoring changes in the infrared absorbance of the hydroxyl group at 3400 wavenumbers, where the signal intensity decreased to 11% of the initial signal upon completion of the reaction. Amyl acid phosphate (24.22 grams) was then added over 20 minutes while the reaction temperature was maintained below 60° C. When the addition was complete, the temperature was held at 60° C. for 1 hour. Thereafter, the resulting polymer was discharged at a temperature of 25-35° C. through a 25 micron filter bag and was observed to have the properties shown below in Table 1.

TABLE 1

| Property: | Value: | Notes on measurements |
|---|---|---|
| Appearance | Clear, yellow liquid | |
| Gardener Color | 3-5 | |
| Brookfield Viscosity | 50-150 centipoise | 25° C., #3 spindle @ 60 rpm |
| Percent Solids | 58.0-62.0% | 100° C. for 15 minutes using a forced air oven |

B. Adhesion-Modified Acid Functional Polyurethane-Urea

In a clean, dry reactor under nitrogen, a solution of an acid functional polyurethane-urea in n-propanol and n-propyl acetate (1,000 grams) were charged. The material was stirred at 25-35° C. Tetraisopropyltitanate (3 grams) was added over 15 minutes and the mixture stirred for 15 minutes. The formation of the intermediate reaction product was followed by monitoring changes in the infrared absorbance of the acid carbonyl group at 3400 wavenumbers, where the signal intensity decreased to 62% of the initial signal upon completion of the reaction. Butyl phosphate (2 grams) was then added over 20 minutes while the reaction temperature was maintained below 60° C. When this addition was complete, the temperature was held at 60° C. for 1 hour. Thereafter, the resulting polymer was discharged at a temperature of 25-35° C. through a 25 micron filter bag.

C. Adhesion-Modified Acid Functional Polyamide Resin

In a clean, dry reactor under nitrogen, n-propanol (350 grams) was charged, along with Cognis Versamid 972 (an acid functional polyamide resin) (150 grams). The resulting reaction slurry was stirred and heated to 50-60° C. until all of the resin dissolved. The reactor temperature was then cooled to 25-35° C. Tetraisopropyltitanate (3 grams) was then added over 15 minutes and the mixture stirred for 15 minutes. The formation of the intermediate reaction product was followed by monitoring changes in the infrared absorbance of the acid carbonyl group at the appropriate wavenumbers, where the signal intensity/absorption decreased by a percentage upon completion of the reaction. Amyl acid phosphate (2 grams) was then added over 20 minutes while the reaction temperature was maintained below 60° C. When this addition was complete, the temperature was held at 60° C. for 1 hour. Thereafter, the resulting polymer was discharged at a temperature of 25-35° C. through a 25 micron filter bag.

D. Adhesion-Modified Hydroxyl Functional Polyester Resin

In a clean, dry reactor under nitrogen, a solution of a hydroxyl functional branched polyester in n-propanol and n-propyl acetate (1,000 grams) were charged. The material was stirred at 25-35° C. Tetraisopropyltitanate (0.6 grams) was then added over 15 minutes and the mixture stirred for 15 minutes. The formation of the intermediate reaction product was followed by monitoring changes in the infrared absorbance of the hydroxyl group at 3400 wavenumbers, where the signal intensity decreased to 50% of the initial signal upon completion of the reaction. Butyl phosphate (0.4 grams) was then added over 20 minutes while the reaction temperature was maintained below 60° C. When this addition was complete, the temperature was held at 60° C. for 1 hour. Thereafter, the resulting polymer was discharged at a temperature of 25-35° C. through a 25 micron filter bag.

Example 2 Preparation of Printing Inks and Testing

A printing ink having the composition detailed in Table 2 was prepared using IA10 adhesion (titanium chelate) promoting agent the synthesis of which is detailed in U.S. Pat. No. 4,659,848, herein incorporated by reference. Additional printing inks were prepared using no adhesion promoting agent, synthetic resin SK, combination of IA10 and SK or the reaction product of the present invention as described in Example 1.

Viscosity Stability

Ink samples were tested using a #3 Zahn dip-type efflux viscosity cup. Table 3 illustrates the results.

TABLE 3

| Ink # | Initial Viscosity | Aged Viscosity (16 hours @ 48° C.) |
|---|---|---|
| 1 | 30 seconds | 24 seconds |
| 2 | 25 seconds | 20 seconds |
| 3 | 30 seconds | 20 seconds |
| 4 | 25 seconds | 22 seconds |
| 5 | 25 seconds | 52 seconds |

Adhesion

Test inks 1-5 were reduced to print viscosity (25 seconds @ 25° C. in a #2 Zahn dip-type efflux viscosity cup) and were printed on treated polypropylene using a flexographic handproofer. "One Bump" indicates one application of ink. "Two Bumps" indicates two applications of the same ink, one over the other. The results are illustrated in Table 4.

TABLE 4

| | Air dried (no heat applied) | | Oven dried (10 seconds @ 80° C. | |
|---|---|---|---|---|
| Ink # | One Bump | Two Bumps | One Bump | Two Bumps |
| 1 | 2 | 5 | 1 | 1 |
| 2 | 2 | 5 | 1 | 2 |
| 3 | 1 | 4 | 1 | 1 |
| 4 | 5 | 4 | 1 | 1 |
| 5 | 5 | 5 | 1 | 4 |

*1 = Best, 5 = Worst

From the above data, the inks of the present invention show superior viscosity stabilization and tape adhesion properties than commercial and prior art inks.

TABLE 2

| | INK #1 IA10 only (Comparative) | INK #2 SK only (Comparative) | INK #3 Experimental (Example 1 A) | INK #4 IA10 and SK (Comparative) | INK #5 Control (Comparative) |
|---|---|---|---|---|---|
| Pigment Red 48:2 | 52.8 | 52.8 | 52.8 | 52.8 | 52.8 |
| SS nitrocellulose | 20.2 | 20.2 | 20.2 | 20.2 | 20.2 |
| isopropyl acetate | 15.4 | 15.4 | 15.4 | 15.4 | 15.4 |
| denatured ethanol | 133.6 | 133.6 | 133.6 | 133.6 | 133.6 |
| n-propyl acetate | 18.0 | 18.0 | 18.0 | 18.0 | 18.0 |
| Total | 240.0 | 240.0 | 240.0 | 240.0 | 240.0 |
| Disperse and add: | | | | | |
| denatured ethanol | 62.6 | 62.6 | 62.6 | 62.6 | 64.5 |
| n-propyl acetate | 19.8 | 19.8 | 19.8 | 20.8 | 20.4 |
| isopropyl alcohol | 15.4 | 15.4 | 15.4 | 15.4 | 15.8 |
| RS nitrocellulose | 15.4 | 15.4 | 15.4 | 15.4 | 15.8 |
| polyurethane | 30.9 | 30.9 | 30.9 | 30.9 | 31.8 |
| Citric acid | 0.8 | 0.8 | 0.8 | 0.8 | 0.9 |
| wax compound | 3.1 | 3.1 | 3.1 | 3.1 | 3.2 |
| slip compound | 7.3 | 7.3 | 7.3 | 7.3 | 7.5 |
| IA10 (titanium chelate) | 4.8 | | | 2.8 | |
| Synthetic Resin SK | | 4.8 | | 1.0 | |
| Example 1 (492-753) | | | 4.8 | | |
| | 400.0 | 400.0 | 400.0 | 400.0 | 400.0 |

Example 3

Laminating Inks #6 and 7 were prepared as detailed in Table 5 using IMO (titanium chelate) adhesion promoting agent and the reactive polymer product described in Example 1.

TABLE 5

| Component: | Percent by weight | |
|---|---|---|
| | Ink #6 Comparative | Ink #7 Experimental |
| Titanium dioxide | 44.1 | 44.1 |
| SS nitrocellulose solution | 2.9 | 2.9 |
| polyurethane | 31.4 | 31.4 |
| n-propyl acetate | 14.7 | 14.7 |
| n-propyl alcohol | 4.9 | 4.9 |
| IA10 titanium chelate | 2 | 0 |
| Product of Example 1 A | 0 | 2 |

Viscosity Stability

The inks were tested using a #3 Zahn dip-type efflux viscosity cup. The results are illustrated in Table 6.

TABLE 6

| Ink # | Initial viscosity | Aged viscosity (16 hours @ 48° C.) |
|---|---|---|
| 6 | 30 seconds | 60 seconds |
| 7 | 30 seconds | 42 seconds |

Adhesion

Inks 6 and 7 were reduced to print viscosity (25 seconds @ 25° C. in a #2 Zahn dip-type efflux viscosity cup) and were printed on treated polypropylene using a flexographic handproofer. "One Bump" indicates one application of ink. "Two Bumps" indicates two applications of the same ink, one over the other. The results are illustrated in Table 7.

TABLE 7

| Ink # | Oven dried (10 seconds @ 80° C.) |
|---|---|
| 6 | 1 |
| 7 | 1 |

1 = Best; 5 = worst

From the above data, the inks of the present invention show superior, viscosity stabilizing than inks containing the adhesion promoter IA10.

Lamination Bond Strength

The lamination bond strength of a standard, conventional ink formulated from a commercial urethane/urea polymer was evaluated against an ink made with the reactive polymer described in Example 1. These results are shown in Table 8.

TABLE 8

| Substrate | Lamination Bond Strength of Commercial Ink | Lamination Bond Strength of Ink formulated with reactive polymer from Example 1 A. |
|---|---|---|
| 48 LBT | 49 | 538 |
| Emblem 1500 Nylon | 434 | 572 |
| 50 M30 | 317 | 685 |
| SP 65 | 70 | 186 |

From Table 8, it can be seen that the inks formulated with the reactive polymer from Example 1 have superior lamination bond strength than commercial inks made with urea/urethane resins.

The invention has been described in terms of preferred embodiments thereof, but is more broadly applicable as will be understood by those skilled in the art. The scope of the invention is only limited by the following claims.

What is claimed is:

1. A polymer complex comprising the reaction product of:
   one or more polyurethanes having:
   a) a terminal or pendent carboxyl group; or
   b) a combination of a terminal or pendent carboxyl group and a terminal or pendent hydroxyl group;
   with at least one metal orthoester and at least one alkyl phosphate.

2. The polymer complex of claim 1, wherein said metal orthoester has the formula metal(OR)$_4$, wherein each of the four R groups is independently an alkyl group.

3. The polymer complex of claim 2, wherein said alkyl group is a $C_1$ to $C_8$ alkyl group.

4. The polymer complex of claim 2, wherein said alkyl group is a $C_3$ to $C_4$ alkyl group.

5. The polymer complex of claim 1, wherein said metal orthoester is tetraisopropyltitanate.

6. The polymer complex of claim 1, wherein said alkyl phosphate is a monoalkyl phosphate having the formula $(R_1O)PO(OH)_2$ or a dialkylphosphate having the formula $(R_2O)(R_3O)PO(OH)$, wherein each of $R_1$, $R_2$ and $R_3$ is independently an alkyl.

7. The polymer complex of claim 6, wherein said alkyl group is a $C_1$ to $C_{10}$ alkyl group.

8. The polymer complex of claim 6, wherein said alkyl group is a $C_1$ to $C_5$ alkyl group.

9. The polymer complex of claim 1, wherein said alkyl phosphate is amyl acid phosphate.

10. An ink or coating composition containing an adhesion promoting agent comprising the reaction product of:
    one or more polyurethanes having
    a) a terminal or pendent carboxyl group; or
    b) a combination of a terminal or pendent carboxyl group and a terminal or pendent hydroxyl group;
    with at least one metal orthoester and at least one alkyl phosphate.

11. The composition of claim 10, wherein said metal orthoester has the formula metal(OR)$_4$, wherein each of the four R groups is independently an alkyl group.

12. The composition of claim 11, wherein said alkyl group is a $C_1$ to $C_8$ alkyl group.

13. The composition of claim 11, wherein said alkyl group is a $C_3$ to $C_4$ alkyl group.

14. The composition of claim 10, wherein said metal orthoester is tetraisopropyltitanate.

15. The composition of claim 10, wherein said alkyl phosphate is a monoalkyl phosphate having the formula ($R_1O$)PO(OH)$_2$ or a dialkylphosphate having the formula ($R_2O$)($R_3O$)PO(OH), wherein each of $R_1$, $R_2$ and $R_3$ is independently an alkyl.

16. The composition of claim 15, wherein said alkyl group is a $C_1$ to $C_{10}$ alkyl group.

17. The composition of claim 15, wherein said alkyl group is a $C_1$ to $C_5$ alkyl group.

18. The composition of claim 15, wherein said alkyl phosphate is amyl acid phosphate.

19. A method of improving the adhesion performance of an ink or coating composition comprising adding to said composition an agent comprising the reaction product of one or more polyurethanes having a terminal or pendent carboxyl group or a combination of a terminal or pendent carboxyl group and a terminal or pendent hydroxyl group, and at least one metal orthoester and at least one alkyl phosphate.

20. The method of claim 19 wherein the viscosity stability of the ink or coating composition is also enhanced.

21. The method of claim 19, wherein said metal orthoester has the formula metal(OR)$_4$, wherein each of the four R groups is independently an alkyl group.

22. The method of claim 21, wherein said alkyl group is a $C_1$ to $C_8$ alkyl group.

23. The method of claim 21, wherein said alkyl group is a $C_3$ to $C_4$ alkyl group.

24. The method of claim 19, wherein said metal orthoester is tetraisopropyltitanate.

25. The method of claim 19, wherein said alkyl phosphate is a monoalkyl phosphate having the formula ($R_1O$)PO(OH)$_2$ or a dialkylphosphate having the formula ($R_2O$)($R_3O$)PO(OH), wherein each of $R_1$, $R_2$ and $R_3$ is independently an alkyl.

26. The method of claim 25, wherein said alkyl group is a $C_1$ to $C_{10}$ alkyl group.

27. The method of claim 25, wherein said alkyl group is a $C_1$ to $C_5$ alkyl group.

28. The method of claim 19, wherein said alkyl phosphate is amyl acid phosphate.

29. The method of claim 19 which also promotes stabilizing the viscosity of the ink or coating composition.

30. The method of claim 29, wherein said metal orthoester has the formula metal(OR)$_4$, wherein each of the four R groups is independently an alkyl group.

31. The method of claim 30, wherein said alkyl group is a $C_1$ to $C_8$ alkyl group.

32. The method of claim 30, wherein said alkyl group is a $C_3$ to $C_4$ alkyl group.

33. The method of claim 29, wherein said metal orthoester is tetraisopropyltitanate.

34. The method of claim 29, wherein said alkyl phosphate is a monoalkyl phosphate having the formula ($R_1O$)PO(OH)$_2$ or a dialkylphosphate having the formula ($R_2O$)($R_3O$)PO(OH), wherein each of $R_1$, $R_2$ and $R_3$ is independently an alkyl.

35. The method of claim 34, wherein said alkyl group is a $C_1$ to $C_{10}$ alkyl group.

36. The method of claim 34, wherein said alkyl group is a $C_1$ to $C_5$ alkyl group.

37. The method of claim 29, wherein said alkyl phosphate is amyl acid phosphate.

* * * * *